(12) United States Patent
Van Dyke et al.

(10) Patent No.: US 7,680,992 B1
(45) Date of Patent: Mar. 16, 2010

(54) READ-MODIFY-WRITE MEMORY WITH LOW LATENCY FOR CRITICAL REQUESTS

(75) Inventors: James M. Van Dyke, Austin, TX (US); Brian D. Hutsell, Fort Worth, TX (US)

(73) Assignee: Nvidia Corporation, Santa Clara, CA (US)

( * ) Notice: Subject to any disclaimer, the term of this patent is extended or adjusted under 35 U.S.C. 154(b) by 495 days.

(21) Appl. No.: 11/613,142

(22) Filed: Dec. 19, 2006

Related U.S. Application Data

(60) Provisional application No. 60/813,811, filed on Jun. 14, 2006.

(51) Int. Cl.
*G06F 12/08* (2006.01)
(52) U.S. Cl. ...................... 711/155; 711/158

(58) Field of Classification Search ............... 711/155, 711/158, 152
See application file for complete search history.

(56) References Cited

U.S. PATENT DOCUMENTS

| | | | | |
|---|---|---|---|---|
| 5,388,108 A | * | 2/1995 | DeMoss et al. | 714/6 |
| 5,666,515 A | * | 9/1997 | White et al. | 711/152 |
| 2002/0194448 A1 | * | 12/2002 | Yu | 711/173 |
| 2006/0036817 A1 | * | 2/2006 | Oza et al. | 711/155 |

* cited by examiner

*Primary Examiner*—Pierre-Michel Bataille
(74) *Attorney, Agent, or Firm*—Cooley Godward Kronish LLP

(57) ABSTRACT

A memory interface permits a read-modify-write process to be implemented as an interruptible process. A pending read-modify-write is capable of being temporarily interrupted to service a higher priority memory request.

20 Claims, 3 Drawing Sheets ved in its include sufficient buffer capacity in individual clients to

READ-MODIFY-WRITE MEMORY WITH LOW LATENCY FOR CRITICAL REQUESTS

This application claims the benefit and priority of Provisional Application No. 60/813,811, entitled "READ-MODIFY-WRITE MEMORY WITH LOW LATENCY FOR CRITICAL REQUESTS," and filed on Jun. 14, 2006, the disclosure of which is incorporated herein by reference in its entirety.

FIELD OF THE INVENTION

The present invention is generally related to read-modify-write (RMW) memory architectures. More particularly, the present invention is directed towards RMW memory architectures in which some types of clients may generate time-critical requests.

BACKGROUND OF THE INVENTION

Graphics systems typically use a frame buffer to store graphics data. One issue that arises in graphics processing is efficiently handling read-modify-write (RMW) requests.

Some of the problems associated with conventional RMW memory architectures may be understood by reference to FIG. 1. FIG. 1 illustrates a prior art graphics system 100. A graphics processing unit (GPU) 105 includes two or more different clients 110-A and 110-B. A memory controller 120 includes an arbiter 125 and a decompression module 130. A frame buffer 135 (e.g., DRAM memory) is configured to store graphics data as either compressed tiles 140 or as uncompressed tiles 145. The tiles may correspond to an integer number of atomic units of memory storage, i.e., the smallest unit of memory storage. An individual 128 B tile may, for example, be comprised of eight atomic units of 16 B each. Compression may, for example, be performed because of bandwidth limitations to reduce the data size that must be transferred over a memory bus 150. The compressed data may, for example, be encoded into one unit of 16 B, representing the entire tile. Compression bits may be stored on-chip to indicate whether a tile is compressed or uncompressed.

However, an individual client 110-B may be a "naïve" client that is not capable of independently performing compression/decompression. When naïve clients perform a read and the data is stored compressed in memory, the memory controller 120 decompresses the read data for the naïve client and returns it uncompressed. In the context of a RMW, when a naïve client makes a possible RMW write request, the memory controller determines if the existing data in memory is compressed, reads that compressed data, decompresses the data, writes out the entire tile to memory in an uncompressed format, before allowing the client to perform its write. In many applications a naïve client 110-B performs only a partial write of tile data. That is, naïve clients modify a small portion of the data in a compressed tile 140. If the naïve client overwrote the entire tile, there would be no need to perform a RMW operation even if the stored data were previously compressed.

Note that a RMW performed on behalf of a naïve client typically takes a significant number of clock cycles to complete due to DRAM write-to-read and read-to-write turnaround time. In another words, a RMW write for a naïve client takes a long time to complete compared to a simple write operation. A RMW operation for a naïve client thus results in accesses from other clients being blocked until the RMW is completed. As a result, RMWs increase the latency for other client reads. One technique in the prior art to address blocking issues was to, as much as possible, attempt to limit the possible number of RMW operations in flight. Another technique in the prior art to address RMW blocking issues was to include sufficient buffer capacity in individual clients to account for the increased read latency caused by RMWs. For example, for isochronous clients additional buffering can be included to account for the latency associated with blocking created by RMWs of other clients. However, providing additional buffering to account for RMW latency increases costs.

In light of the above-described problems the apparatus, system, and method of the present invention was developed.

SUMMARY OF THE INVENTION

A memory interface is disclosed in which a read-modify-write process is capable of being performed as an interruptible process. In one implementation, when a memory request is received that has a higher priority than a pending read-modify-write the pending read-modify-write is temporarily interrupted in order to service the higher priority memory request.

In one embodiment, a memory interface includes an arbiter to arbitrate memory requests from a plurality of clients. The memory interface includes an interruptible read-modify-write (RMW) module to process memory requests received from the arbiter such that a RMW operation initiated to fulfill a memory request is capable of being temporarily interrupted to process another memory request.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
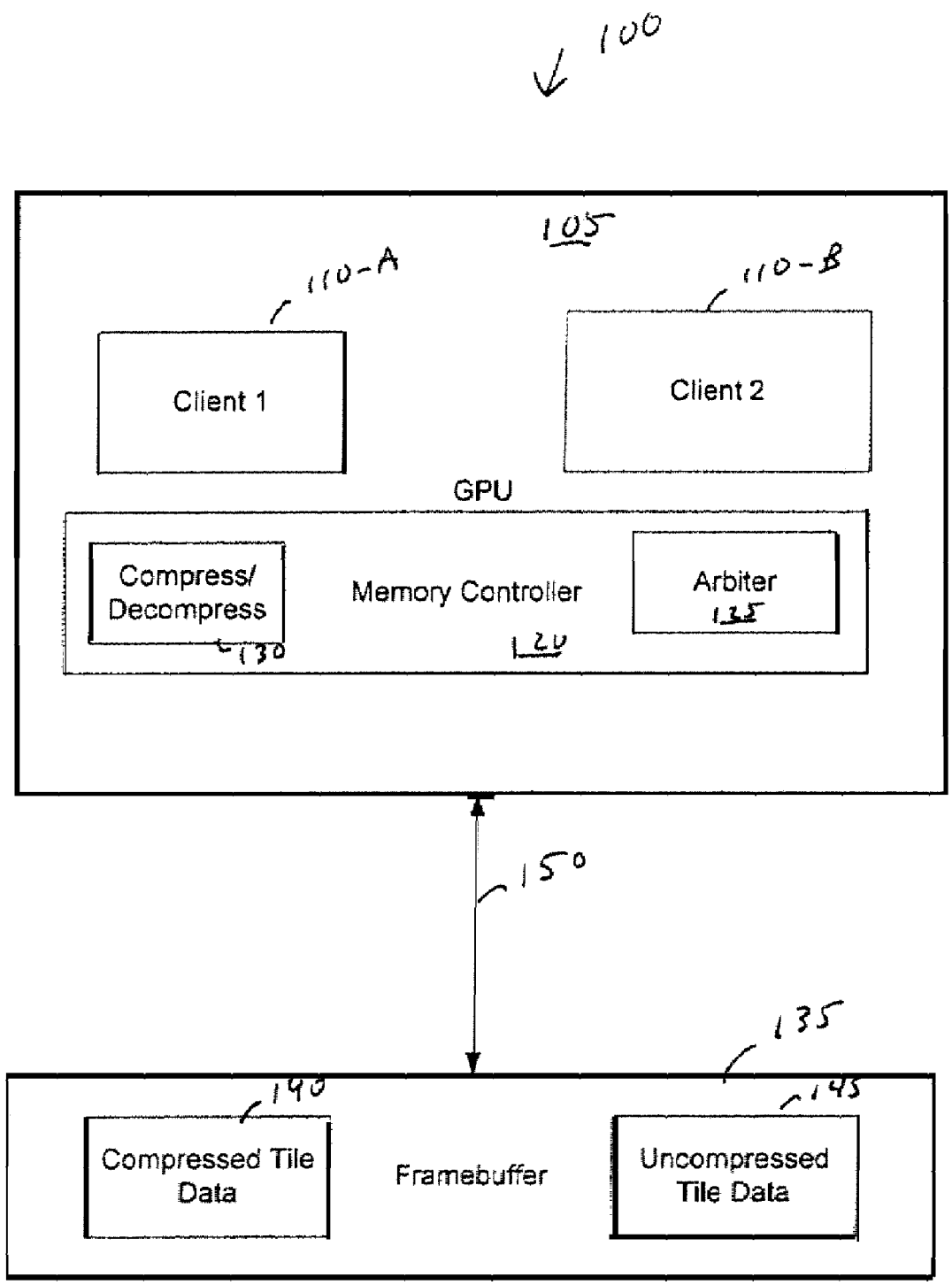
FIG. 1 is a block diagram of a prior art graphics system.
Figure 2:
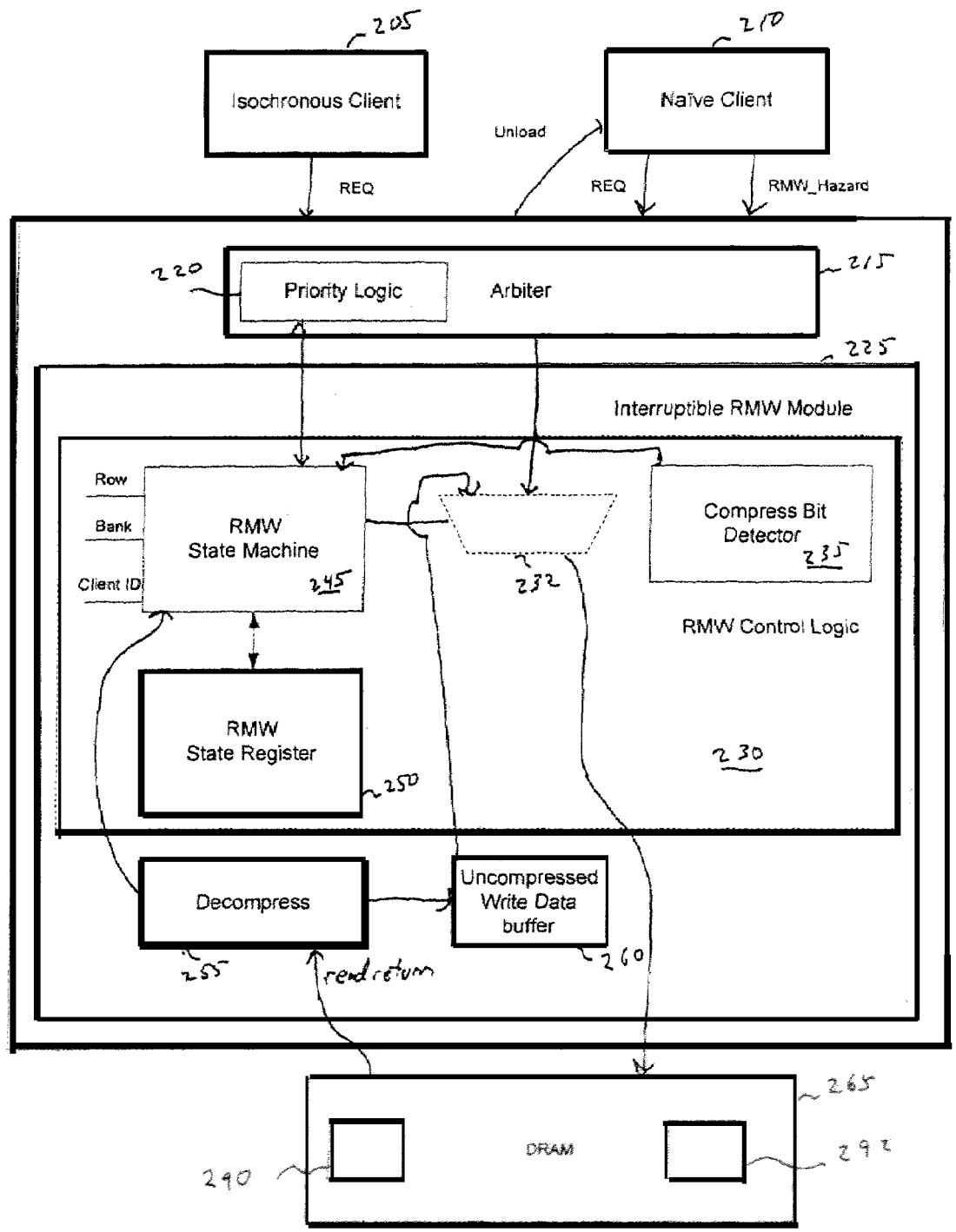
FIG. 2 is a block diagram of a read-modify-write memory architecture in accordance with one embodiment of the present invention.

FIG. 2 illustrates a memory interface 200 in accordance with one embodiment of the present invention. Memory interface 200 includes an arbiter 215 that receives memory requests from different clients, such as an isochronous client 205 and a naïve client 210. An individual memory request may, for example, be a read or write request to memory addresses within tiles 290 and 292 of a memory 265. Memory 265 may, for example, be a dynamic random access memory. An individual tile 290 and 292 corresponds to a compressible unit of data transfer. Additionally, an individual memory request may also be a blocking read-modify-write memory request, as described below in more detail. In the context of graphics systems, a read-modify-write occurs when uncompressed data overwrites a compressed memory unit (e.g., overwrites a compressed memory tile).

Arbiter 215 includes priority logic 220 to identify memory request priority. As one example, an individual memory request (REQ) may include bits identifying the priority of a memory request. Alternatively, priority may be based on identifying the client that issued a particular memory request. In the most general case, arbiter 215 receives a sequence of memory requests over time in which the memory requests originate from different clients, such as clients 205 and 210, and in which the memory requests have different priorities (e.g., high and low priority). As one example, memory requests from an isochronous client 205 may be assigned a high priority whereas a possible RMW write has a lower priority.

Memory interface 200 also includes an interruptible read-modify-write (RMW) module 225 to implement a read-modify-write as an interruptible process. An individual client, such as naïve client 210 may issue a memory request corresponding to a partial write over a compressible memory unit (e.g., a tile). The naïve client 210 lacks a capability to perform decompression of compressed tile data. In one implementation, naïve client 210 generates a RMW_Hazard signal with a memory request to indicate that the memory request is a potentially blocking RMW if the source data is compressed.

Interruptible RMW module 225 preferably includes RMW control logic 230 to identify RMW memory requests capable of blocking high priority memory requests. Control logic 230 may include RMW state machine 245, which sequences through the RMW process. Control logic 230 may, for example, include a multiplexer 232 to control the flow of memory requests. For example one or more multiplexers 232 may receive inputs such as inputs from the RMW state machine 245, RMW state registers 250, and decompress module 255. RMW state machine 245 may also receive other inputs, such as the RMW_Hazard signal. The control logic 230 may then be programmed to direct the servicing of memory requests. For example, the RMW_Hazard signal may be used as one enable signal for RMW control logic 230. In one embodiment, control logic 230 checks the compression status for the tile memory location associated with a memory request if the RMW_Hazard signal is received. A compression bit detector 235 reads compression tags associated with atomic units of memory (i.e., memory tiles) that are maintained in a memory system to record the compression status of tiles. If the tag=zero for a tile that the memory request is addressed to, the tile is uncompressed, and no RMW occurs. However, if the tag=nonzero for the tile that the memory request is address to, the tile is compressed. If the tile is compressed and RMW is enabled, an RMW process is initiated in which compressed tile data is read in compressed form, decompressed in decompress module 255, uncompressed data written (e.g., first to uncompressed write buffer 260 as the data is uncompressed, and then to memory 265), and then the client write proceeds. The write-to-read and read-to-write sequence of an RMW has the potential to block other requests for a substantial number of clock cycles.

Interruptible RMW module 225 may also include conventional components to support read and write operations. Simple reads (e.g., compressed reads or uncompressed reads) are comparatively low latency compared to a RMW. Similarly, a simple write is a comparatively low latency operation.

In one embodiment, an RMW process that is initiated is marked as a pending RMW. For a pending RMW, an RMW state machine 245 is initiated. RMW state machine includes an associated RMW state register 250. The RMW state machine records state information such as a client identifier and a memory address (e.g., row and bank and column address) of a tile. RMW state machine 245 is configured to implement a RMW process as a sequence of states that can be interrupted and resumed at a later time. RMW state machine 245 may, for example be communicatively coupled to RMW control logic 230, and decompress module 255, uncompressed write data buffer 260 such that RMW state machine 245 receives status reports on the state of different components in interruptible RMW module 225. In one embodiment, all hazard RMW writes run at a slower speed, e.g., one-half speed. This is because RMW hazard writes require one cycle to perform the compress tag read to determine memory compress state before committing the memory write access.

In one embodiment, after arbiter 215 accepts a RMW memory request from client 210, memory interface 200 initiates an interlock to prevent any intervening writes to the same tile location of the pending RMW. This is to prevent intervening operations from writing over the same data locations as the pending RMW. Were the RMW uncompressed write back to happen after an intervening write, the intervening write data would be lost.

The interlock may for example, block all RMW hazards to the same tile. Another interlock blocks all other RMW hazard requests except the pending one. The RMW state machine and registers only have resources to allow one pending RMW operation at any given time. The tile compress tag bit(s) are not updated to reflect uncompressed status until the decompressed tile write occurs. This is to prevent a subsequent read during the RMW operation from misinterpreting the compressed data in the tile as uncompressed.

Additionally, client 210 is not unloaded until the pending RMW is completed. That is, arbiter 220 does not send an acknowledgement to client 210 indicating that additional memory requests will be accepted until the pending RMW completes. Since RMWs are typically implemented for partial writes, client 210 will typically not be unloaded until the RMW operation is complete and the partial write occurs. This prevents the pending RMW request from blocking the data and control paths required for normal reads and writes from other clients.

In one embodiment, arbiter 220 is programmed to accept high priority memory requests from client 205 while a pending RMW for client 210 is in progress. For example, in response to receiving a high priority memory request, RMW control logic 230 may suspend a pending RMW. For this case, the RMW state machine 245 is triggered by RMW control logic 230 to record state information for the current state of the pending RMW (if it hadn't when the RMW was first initiated) and then suspend the RMW process. The high priority memory request is then serviced. After the high priority memory request has been serviced, RMW control logic 230 triggers RMW state machine 245 to resume the pending RMW. Alternatively some of the control logic for triggering suspension of a pending RMW and recovery of a suspended RMW may be placed in arbiter 215.

Figure 3:
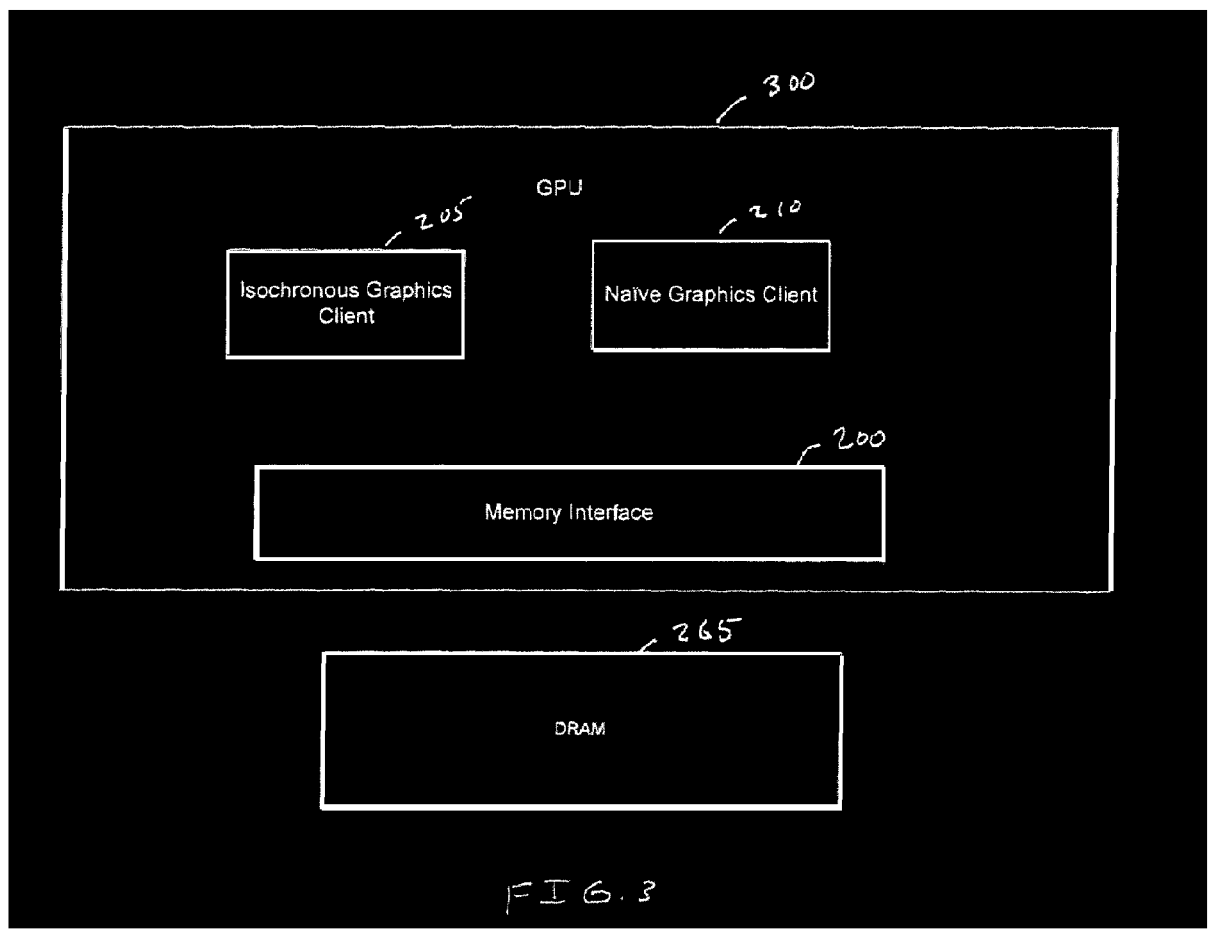
FIG. 3 is a block diagram of a graphics processing unit including the memory architecture of the present invention.

As illustrated in FIG. 3, one application of memory interface 200 is in a graphics system. In particular memory interface 200 may be disposed in a graphics processing unit 300 and used to access a frame buffer memory.

One benefit of the present invention is that the latency for servicing high priority memory requests is reduced. RMW operations that would conventionally block time-critical requests, such as requests from isochronous clients, can be interrupted to permit servicing of the time-critical requests. As a result, the latency for servicing critical requests is reduced.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A memory interface, comprising:
    an arbiter to arbitrate memory requests from a plurality of clients; and
    an interruptible read-modify-write (RMW) module to process RMW memory requests received from said arbiter such that a RMW operation initiated to fulfill a memory request that is in progress is capable of being temporarily interrupted to process another memory request, the memory interface for a temporarily interrupted RMW operation suspending the RMW operation and storing state information for the temporarily interrupted RMW operation to permit processing of the temporarily interrupted RMW operation to be resumed after processing said another memory request.

2. The memory interlace of claim 1, wherein said interruptible RMW module preserves state information for said RMW memory requests to be processed after an interruption.

3. The memory interface of claim 2, wherein said interruptible read-modify-write module comprises a RMW state machine to implement each of said RMW memory requests.

4. The memory interface of claim 1, wherein said arbiter blocks other RMW memory requests while a current RMW is pending.

5. The memory interface of claim 4, wherein said arbiter blocks other RMW memory requests to the same memory locations as the current RMW to prevent an intervening write.

6. The memory interface of claim 4, wherein said memory interface accesses a memory in which data is stored in tiles and said arbiter blocks other RMW memory requests to the same compressed tile for which a current RMW is pending.

7. The memory interface of claim 1, wherein a client associated with a pending RMW memory request is not unloaded after the pending RMW is completed.

8. The memory interface of claim 7, wherein a client associated with a pending RMW memory request is not unloaded after the pending RMW is complete and a partial write occurs.

9. The memory interface of claim 1, wherein compression tags are utilized to indicate compression status of units of memory, said memory interface changing a compression tag associated with a unit of memory for the RMW operation from a compressed status to an uncompressed status in response to decompressed data for the RMW operation being written back.

10. The memory interface of claim 1, wherein said memory interface receives a RMW hazard signal from a client issuing a memory request having the potential to generate a RMW, said memory interface utilizing said RMW hazard signal as an indicator that a particular memory request may require a RMW operation.

11. The memory interface of claim 1, wherein a RMW operation is required for a memory request if an associated RMW hazard signal is received and the compression status for a unit of memory storage associated with the memory request has a compressed status.

12. The memory interface of claim 1, further comprising a decompression module configured to decompress data stored in memory as part of a RMW operation in which compressed data is read from memory and decompressed.

13. The memory interface of claim 1, wherein said arbiter includes priority logic, said memory interface in response to detecting a high priority client request, while a low-priority RMW request is being processed for another client, suspending the low-priority RMW request in order to service the high priority client request.

14. The memory interface of claim 1, wherein said interruptible RMW module comprises a read-modify-write (RMW) state machine to implement an RMW process as a sequence of states with sufficient state information recorded to return to the RMW process after an interruption.

15. The memory interface of claim 14, further comprising a decompression module configured to decompress data stored in memory as compressed data.

16. The memory interface of claim 15, wherein said memory interface includes a write buffer for decompressed data generated by said decompression module.

17. The memory interface of claim 16, wherein the low-priority RMW request is a RMW request in which uncompressed data is overwritten onto compressed data.

18. The memory interface of claim 17, wherein said low priority RMW request requires reading compressed data from memory, decompressing the compressed data, writing uncompressed data back into memory, and then permitting a write.

19. A method of interfacing clients to a memory, comprising:
    in response to detecting a first memory request from a first client that is a read-modify-write memory request, initiating an interruptible read-modify-write memory request process;
    in response to detecting a second memory request from a second client that is a high priority request interrupting said first memory request to service said second memory request, said interrupting including suspending said first memory request and storing state information for the first memory request to be resumed subsequent to processing said second memory request; and
    in response to completing said second memory request, resuming said first memory request.

20. The method of claim 19, wherein said instantiating comprises instantiating a state machine for said interruptible read-modify-write memory request process.

* * * * *